US00RE34190E

United States Patent [19]

Rubinstein

[11] E Patent Number: Re. 34,190

[45] Reissued Date of Patent: Mar. 9, 1993

[54] CONNECTOR ARRANGEMENT

[75] Inventor: Leon Rubinstein, Natick, Mass.

[73] Assignee: Rogers Corporation, Rogers, Conn.

[21] Appl. No.: 525,875

[22] Filed: May 17, 1990

Related U.S. Patent Documents

Reissue of:

[64] Patent No.: 4,744,764
Issued: May 17, 1988
Appl. No.: 867,473
Filed: May 27, 1986

[51] Int. Cl.[5] ..... H01R 9/09
[52] U.S. Cl. ..... 439/67; 439/260
[58] Field of Search ..... 439/59-62, 439/77, 67, 260, 259, 325-329, 629-632

[56] References Cited

U.S. PATENT DOCUMENTS

| | | | |
|---|---|---|---|
| Re. 31,114 | 12/1982 | Berg | 339/17 CF |
| 2,952,002 | 9/1960 | Angele | 339/75 |
| 2,968,016 | 1/1981 | Angele | 339/75 |
| 3,059,211 | 10/1982 | Thomas | 339/126 |
| 3,102,767 | 9/1963 | Schneck | 339/176 |
| 3,158,421 | 11/1964 | Hasenauer | 339/176 |
| 3,319,216 | 5/1967 | McCullough | 339/176 |
| 3,356,983 | 12/1967 | Johnson | 339/14 |
| 3,401,369 | 9/1968 | Palmateer | 339/17 |
| 3,432,799 | 3/1969 | Richards | 339/99 |
| 3,489,990 | 1/1970 | Parker | 339/75 |
| 3,526,869 | 9/1970 | Conrad | 339/75 |
| 3,587,031 | 6/1971 | Flavin | 339/75 MP |
| 3,597,660 | 8/1971 | Jensen | 317/101 C |
| 3,602,870 | 8/1971 | Willard | 339/17 |
| 3,609,463 | 9/1971 | Laboue | 317/101 DH |
| 3,614,707 | 10/1971 | Kaufman | 339/17 F |
| 3,629,787 | 12/1971 | Wilson | 339/17 |
| 3,636,814 | 10/1968 | Inacker | 339/176 MP |
| 3,646,504 | 2/1972 | Classon | 339/176 MP |
| 3,715,706 | 2/1973 | Michel | 339/156 R |
| 3,748,630 | 7/1973 | Robinson | 339/74 R |
| 3,763,462 | 10/1973 | Ecker | 339/176 MP |
| 3,772,775 | 11/1973 | Bonnke | 29/628 |
| 3,818,415 | 6/1974 | Evans | 339/17 F |
| 3,824,529 | 7/1974 | Dorrell | 339/99 |
| 3,848,222 | 11/1974 | Lightner | 339/78 M |
| 3,853,382 | 12/1974 | Lazar | 339/95 R |
| 3,881,799 | 5/1975 | Elliott | 339/252 R |
| 3,922,054 | 11/1975 | Dechelette | 339/75 MP |
| 3,944,313 | 3/1976 | McKeown | 339/75 MP |
| 3,967,162 | 6/1976 | Ceresa | 317/101 CM |
| 4,008,938 | 2/1977 | Anhalt | 339/17 CF |
| 4,046,443 | 9/1977 | Champagne | 339/66 M |
| 4,050,755 | 9/1977 | Hasircoglu | 339/17 F |
| 4,054,348 | 10/1977 | Stroupe | 339/91 R |
| 4,077,688 | 3/1978 | Cobaugh | 339/74 R |

(List continued on next page.)

FOREIGN PATENT DOCUMENTS

| | | |
|---|---|---|
| 700490 | 12/1953 | United Kingdom . |
| 1180027 | 2/1970 | United Kingdom . |
| 2134331 | 8/1984 | United Kingdom . |

OTHER PUBLICATIONS

Burke, "Flex Circuit Zero Insertion Force Connector", *IBM Technical Disclosure Bulletin*, vol. 26, No. 12, (May 1984).

(List continued on next page.)

*Primary Examiner*—Neil Abrams

[57] ABSTRACT

A connector system for electrically connecting contacts of a flexible printed circuit carried by a daughter board with fixed contacts carried by a mother board, the flexible circuit serving as a connector to circuits on the daughter board, and the contacts of the flexible printed circuit arranged on an edge of the daughter board. Guides on the mother board enable the daughter board to slide in guided, edge-wise direction toward the face of the mother board, with the contacts on the flexible circuit in registry with contacts on the mother board. Driven cam/locking means carried by the mother board engages mating structure on the daughter board to press the edge of the daughter board tightly toward the face of the mother board in locking motion while camming the daughter board bodily laterally over the surface of the mother board whereby the contacts wipe upon one another as they move into locked position.

39 Claims, 4 Drawing Sheets

U.S. PATENT DOCUMENTS

| | | | |
|---|---|---|---|
| 4,080,027 | 3/1978 | Bensantti | 339/17 F |
| 4,116,516 | 9/1978 | Griffin | 339/17 F |
| 4,116,517 | 9/1978 | Selvin | 339/17 F |
| 4,125,310 | 11/1978 | Reardon | 339/92 M |
| 4,159,861 | 7/1979 | Anhalt | 339/75 MP |
| 4,164,003 | 8/1979 | Cutchaw | 361/403 |
| 4,169,641 | 10/1979 | Olsson | 339/17 F |
| 4,169,642 | 10/1979 | Mouissie | 339/17 F |
| 4,211,459 | 7/1980 | Madden | 339/75 MP |
| 4,222,622 | 9/1980 | Griffin | 339/17 CF |
| 4,261,631 | 4/1981 | Guilcher et al. | 339/75 |
| 4,264,114 | 4/1981 | Chandler | 339/17 LC |
| 4,288,140 | 9/1981 | Griffith | 339/74 R |
| 4,330,163 | 9/1978 | Aikens | 339/74 R |
| 4,392,700 | 7/1983 | Showman | 339/17 M |
| 4,392,705 | 7/1983 | Andrews | 339/75 MP |
| 4,402,563 | 9/1983 | Sinclair | 335/75 M |
| 4,403,272 | 9/1983 | Larson | 361/398 |
| 4,416,497 | 11/1983 | Brandsness | 339/17 F |
| 4,420,203 | 12/1983 | Aug | 339/17 CF |
| 4,420,206 | 12/1984 | Martyniak | 339/75 M |
| 4,453,795 | 6/1984 | Moulin | 339/92 M |
| 4,461,522 | 7/1984 | Bakermans | 339/17 M |
| 4,464,832 | 8/1984 | Asick | 29/839 |
| 4,468,074 | 8/1984 | Gordon | 339/75 M |
| 4,474,133 | 10/1984 | Cosmo | 339/17 M |
| 4,480,884 | 11/1984 | Babuka | 339/17 L |
| 4,505,527 | 3/1985 | Reimer | 339/17 LM |
| 4,509,811 | 4/1985 | Amano | 339/17 LM |
| 4,511,197 | 8/1986 | Grabbe | 339/74 R |
| 4,517,625 | 5/1985 | Frink | 361/339 |
| 4,518,210 | 5/1985 | Morrison | 339/17 LM |
| 4,533,203 | 8/1985 | Feldman | 339/176 M |
| 4,538,866 | 9/1985 | Johnson | 339/17 LM |
| 4,540,227 | 9/1985 | Faraci | 339/17 F |
| 4,540,228 | 9/1985 | Steele | 339/74 R |
| 4,548,451 | 10/1985 | Benarr | 339/17 M |
| 4,552,420 | 11/1985 | Eigenbrode | 339/14 R |
| 4,556,268 | 12/1985 | Noschese | 339/74 |
| 4,560,221 | 12/1985 | Olsson | 339/75 MP |
| 4,585,288 | 4/1986 | Aikens | 339/75 MP |
| 4,587,596 | 5/1986 | Bunnell | 361/398 |
| 4,597,619 | 7/1986 | Reimer | 339/75 MP |
| 4,598,966 | 7/1987 | Boland | 339/75 MP |
| 4,606,594 | 8/1986 | Grabbe | 339/74 R |
| 4,610,495 | 9/1986 | Landi | 339/75 MP |
| 4,626,056 | 12/1986 | Andrews | 339/75 MP |
| 4,629,270 | 12/1986 | Andrews | 339/75 MP |
| 4,636,019 | 1/1987 | Gillett | 339/17 M |
| 4,636,022 | 1/1987 | Sonobe | 339/75 MP |
| 4,655,524 | 4/1987 | Etzel | 339/59 M |
| 4,671,592 | 6/1987 | Ignasiak | 339/331 |
| 4,691,972 | 9/1987 | Gordon | 439/77 |
| 4,693,529 | 9/1987 | Stillie | 439/67 |
| 4,717,345 | 1/1988 | Gordon et al. | 439/67 |
| 4,780,603 | 10/1988 | Hamada | 235/492 |
| 4,781,611 | 11/1988 | Leonard | 439/259 |
| 4,863,395 | 9/1989 | Babuka | 439/260 |
| 4,871,324 | 10/1989 | Brune | 439/189 |
| 4,881,901 | 11/1989 | Mendenhall | 439/65 |
| 4,892,487 | 1/1990 | Dranchak et al. | 439/260 |

FOREIGN PATENT DOCUMENTS

"*Gold Dot Connections in Advanced Electronics*", Hughes Aircraft Company.

Gordon, "Backplane Interconnection System", *IEPS*, Rogers Corporation (1986).

Hinrichsmayer "Combined Action Zero Insertion Connector", *IBM Technical Disclosure Bulletin*, vol. 26, No. 12 (May 1984).

FIG 2A
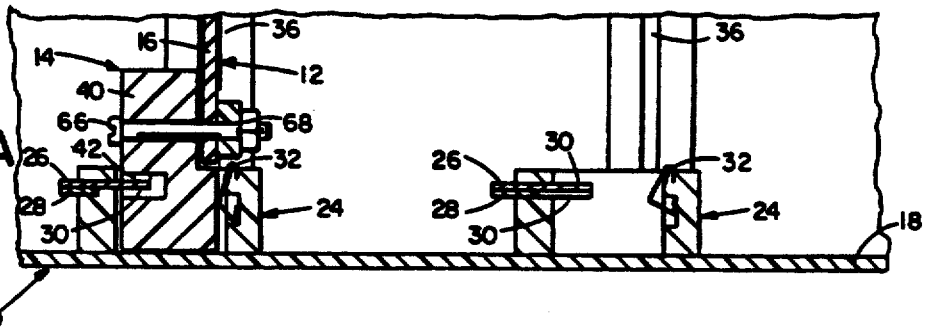
FIG 4
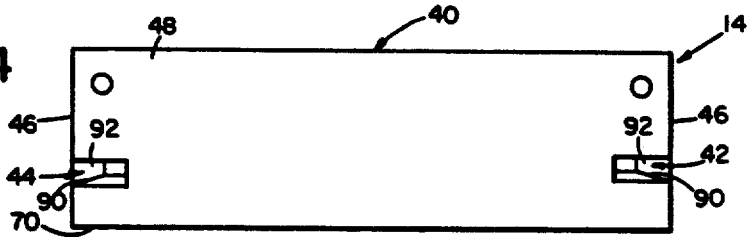
FIG 5
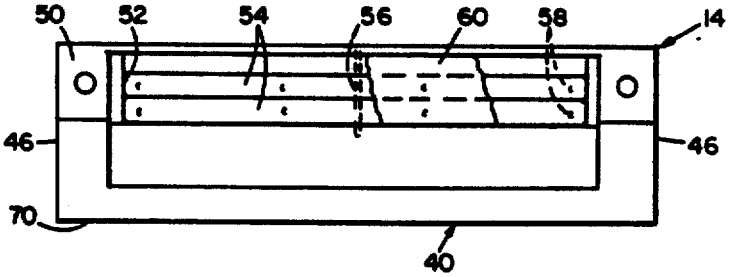
FIG 6
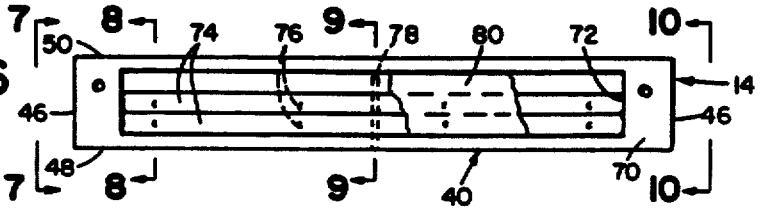
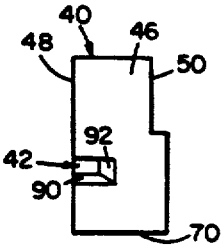
FIG 7
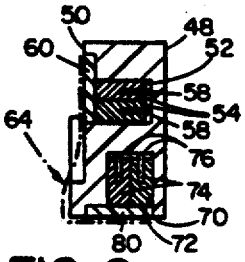
FIG 8
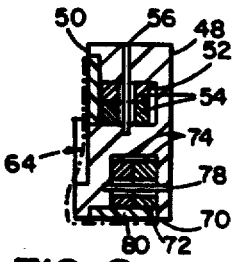
FIG 9
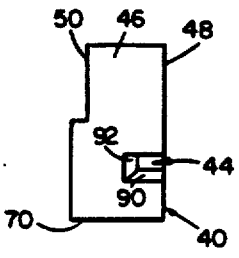
FIG 10
FIG 11
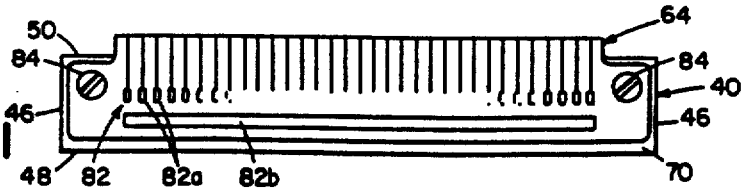

FIG 12
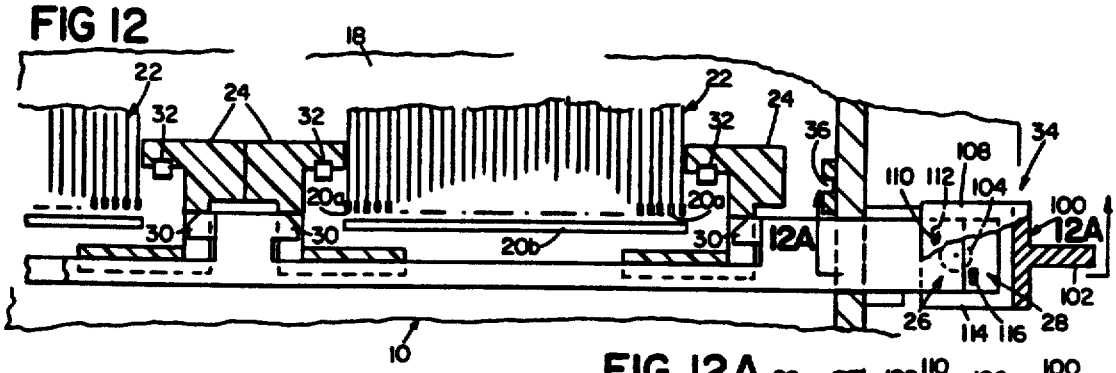
FIG 12A
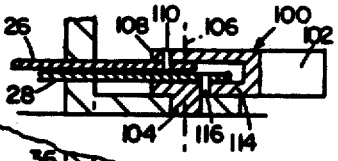
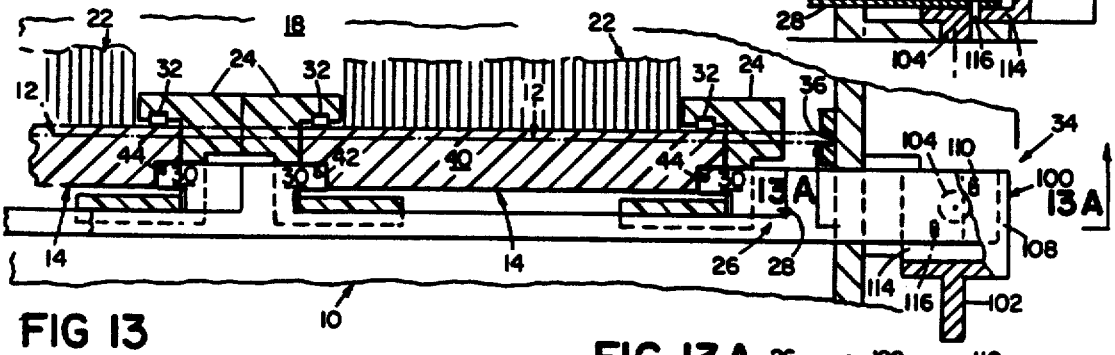
FIG 13
FIG 13A
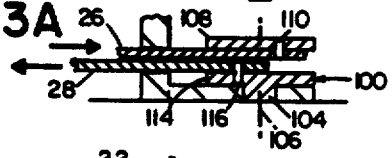
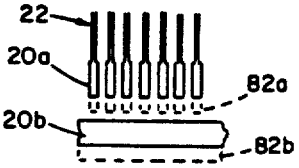
FIG 14A
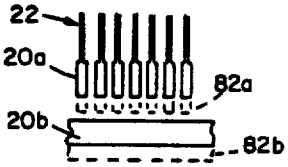
FIG 15A
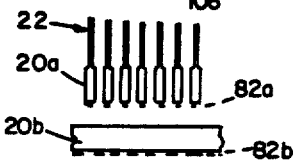
FIG 16A
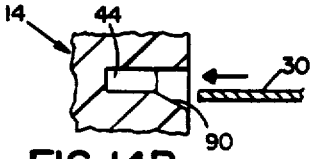
FIG 14B
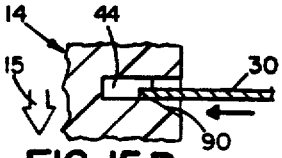
FIG 15B
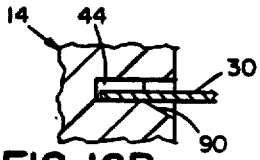
FIG 16B
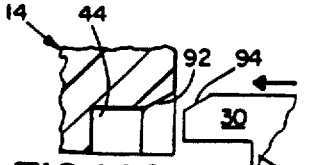
FIG 14C
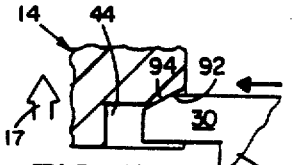
FIG 15C
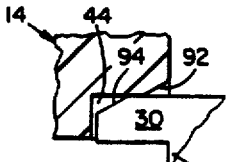
FIG 16C

CONNECTOR ARRANGEMENT

Matter enclosed in heavy brackets [ ] appears in the original patent but forms no part of this reissue specification; matter printed in italics indicates the additions made by reissue.

This invention relates to electrical circuit interconnections, and more particularly to connector arrangements of the releasable (solderless) type that are particularly useful with plural conductor connector systems such as those used with mother-daughter connector systems of computers.

Integrated circuitry developments require circuit interconnection configurations of greater density, as well as circuit path configurations that control impedance and resistive effects which may alter circuit performance. Conventionally employed methods of interconnecting electrical or electronic circuit components have included the "pin and socket" type and the so-called "zero force insertion" type in which a circuit card may be inserted when cooperating contacts are in an open position, and the contacts are then cammed to a closed position. These and other techniques have required substantial space or generally have a tendency to utilize complex arrangements and complicated manufacturing procedures. Additionally, certain types of commercially employed connectors cannot be easily matched in impedance to the circuit cards being connected, thus causing reflections which degrade signal quality. Such problems are particularly acute when connectors are used with newer generation semiconductors which have high switching speeds (100–500 picosecond rise time, low switching energy and signal swings in the microvolts range).

In accordance with one aspect of the invention, there is provided a connector system for electrically connecting contacts of a flexible printed circuit (such as stripline or microstrip) carried by a first (e.g., daughter) printed circuit board with fixed contacts carried by a second (e.g., mother) printed circuit board, the flexible circuit serving as a connector to circuits on the first board, and the contacts of the flexible printed circuit arranged on an edge of the first board. The system includes guides on the second board for enabling the first board to slide in guided, edge-wise direction toward the face of the second board, with the contacts on the flexible circuit in registry with contacts on the second board. Driven cam/locking means carried by the second board engages mating structure on the first board to press the edge of the first board tightly toward the face of the second board in locking motion while camming the first board bodily laterally over the surface of the second board whereby the contacts wipe upon one another as they move into locked position.

In preferred embodiments, the mating structure on the first board comprises a series of block members extending along the edge of the first board, oppositely directed ends of each of the blocks defining ramp surfaces, the cam/locking means comprises at least one pair of oppositely movable driven members engageable on corresponding ramp surfaces defined on the mating structure on the first board and the driven members are adapted to move against the ramp surfaces in motion parallel to the face of the second board and parallel to the edge of the first board.

In accordance with another aspect of the invention, there is provided an electrical connector system electrically interconnecting conductive paths of a first circuit with corresponding electrically conductive paths of a second circuit that includes a first circuit board on which the first circuit, a first planar array of pad-type contacts connected to the first circuit, a connector receptacle, and latch mechanism that includes opposed camming surfaces and actuator means for moving the opposed camming surfaces between an open (released) position and a latched position are disposed. Disposed on a second circuit board are the second circuit, a connector block, a second planar array of pad-type contacts on the connector block. Formed in the connector block are a pair of recesses, each of which has first and second ramp surfaces in orthogonal relation to one another. The latch actuator structure is operable, with the connector block disposed in the connector receptacle and the pad-type contact arrays in face to face engagement, to cause the opposed camming surfaces of the latch members to enter the recesses and interact with the orthogonal ramp surfaces to produce conjoint clamping and wiping action of said engaged pad-type contact arrays, the latch members in their latched position being disposed in the recesses and securing the first and second circuit boards together.

This conjoint camming action in coordinated manner increases the contact pressure of the mating pad-type contacts and concurrently provides transverse "wiping" action of the mating contacts to remove debris or other foreign matter (such as corrosive films) which may adversely affect electrical circuit performance. The sequential relationship of the contact 'wiping' and pressure increasing actions may be varied as desired by appropriate angular disposition and/or relative positioning of the ramp surfaces or by selective shaping of latch member ramp engaging surfaces, or both. In a particular embodiment, ramp surface defining recesses are at opposite ends of the connector block, and ramp engaging edges of the latch members are slanted and coact so that contact pressure is increased prior to initiation of transverse 'wiping' action contact movement.

In particular embodiments, the connector receptacle includes connector block biasing means opposite the latch structure, guide channel structure is carried by the first circuit board for receiving the second circuit board, and a flexible circuit that includes a plurality of conductor traces, a conductive ground plane and a dielectric spacer connects the array of pad-type contacts on the connector block with circuit elements carried by the second circuit board. An elastomeric member (of silicone or urethane, for example) supplemented by plurality of spring loaded biasing members provides resilient mounting for one contact array to enhance reliable electrical connection between the contact arrays, the elastomeric pad member distributing the resilient contact loading force, with the spring loaded biasing members providing distributed supplemental loading, and the springs providing compensation for creep, variations in the thickness or resilience of the pad, and/or other factors contributing to loss of stress in the elastomer.

In accordance with still another aspect of the invention, there is provided a high frequency electrical connector system for electrically interconnecting conductive paths of a first circuit element with corresponding conductive paths of a second circuit element. The system includes a first planar array of pad-type contacts that are disposed on a nonconductive substrate and connected to a first circuit on the substrate. Flexible sheet-form plural conductor transmission line structure has one end electrically connected to the cooperating electrical circuit and the other end connected to corresponding pad-type contacts of the array. The array of pad-type contacts of the flexible sheet-form transmission line structure is mounted on a rigid nonconductive contact support structure with a resilient contact array mounting that includes an elastomeric member supplemented by a plurality of spring loaded biasing members, the elastomeric pad member distributing the resilient contact loading force, the spring loaded biasing members providing distributed supplemental contact loading, and the springs providing compensation for creep, variations in the thickness or resilience of the pad, and/or other factors contributing to loss of stress in the elastomer pad. A cooperating second array of pad-type contacts is mounted on a rigid nonconductive contact support structure. In preferred embodiments, the plural conductor transmission line structure includes a ground plane and plural conductor traces that have characteristic impedances matched to the impedance of the electrical circuit to which they are connected.

Solderless electrical connectors of the invention provide accurate and reliable high density electrical connections with impedence matching and high quality signal transmission characteristics.

Other features and advantages of the invention will be seen as the following description of a particular embodiment progresses, in which:

FIG. 2A is a sectional view taken along the line 2A—2A of FIG. 1A;

FIG. 4 is a front elevational view of a connector block employed on the daughter board of the connector system shown in FIGS. 1-3;

FIG. 5 is a rear elevational view of the connector block shown in FIG. 4, with portions broken away;

FIG. 6 is a bottom view of the connector block, with portions broken away;

FIGS. 7-10 are views of the connector block taken along the lines 7—7, 8—8, 9—9, and 10—10 of FIG. 6;

FIG. 11 is a bottom view of the connector block with a pad-type connector array secured thereto;

FIG. 12 is an enlarged plan view of a portion of the connector system with the latch members in open position;

FIG. 12A is a sectional view of the latch actuator taken along the line 12A—12A of FIG. 12;

FIG. 13 is a view, similar to FIG. 12, showing a connector block latched in the connector system;

FIG. 13A is a sectional view of the latch actuator taken along the line 13A—13A of FIG. 13; and FIGS. 14A 15A and 16A are diagrammatic top views of signal pads 20a, 82a and ground terminals 20b, 82b, FIGS. 14B, 15B and 16B are diagrammatic side views of camming portion 30; FIGS. 14C, 15C and 16C are diagrammatic top views of camming portion 30; FIGS. 14A-14C showing an initial position of camming portion 30 with signal pads 20a, 82a and ground terminals 20b, 82b in generally aligned offset position, FIGS. 15A-15C showing an intermediate position of camming portion 30 with pressure applied to signal pads 20a, 82a and ground terminals 20b, 82b, and FIGS. 16A-16C showing a final position of camming portion 30 with signal pads 20a, 82a and ground terminals 20b, 82b moved into aligned position with concurrent wiping action.

DESCRIPTION OF PARTICULAR EMBODIMENT

Figure 2:
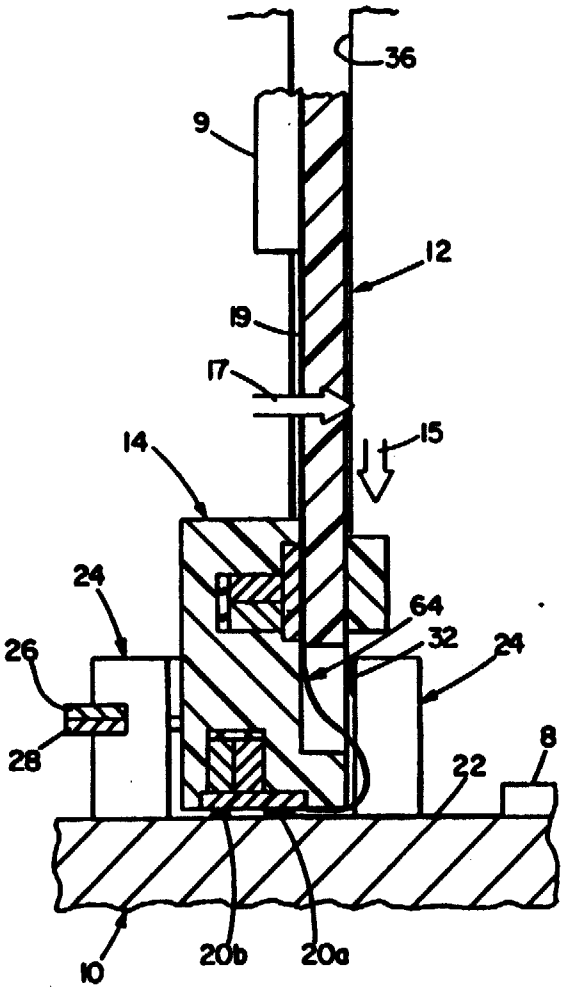
FIG. 2 is a diagrammatic sectional view taken along the line 2—2 of FIG. 1.
Figure 1:
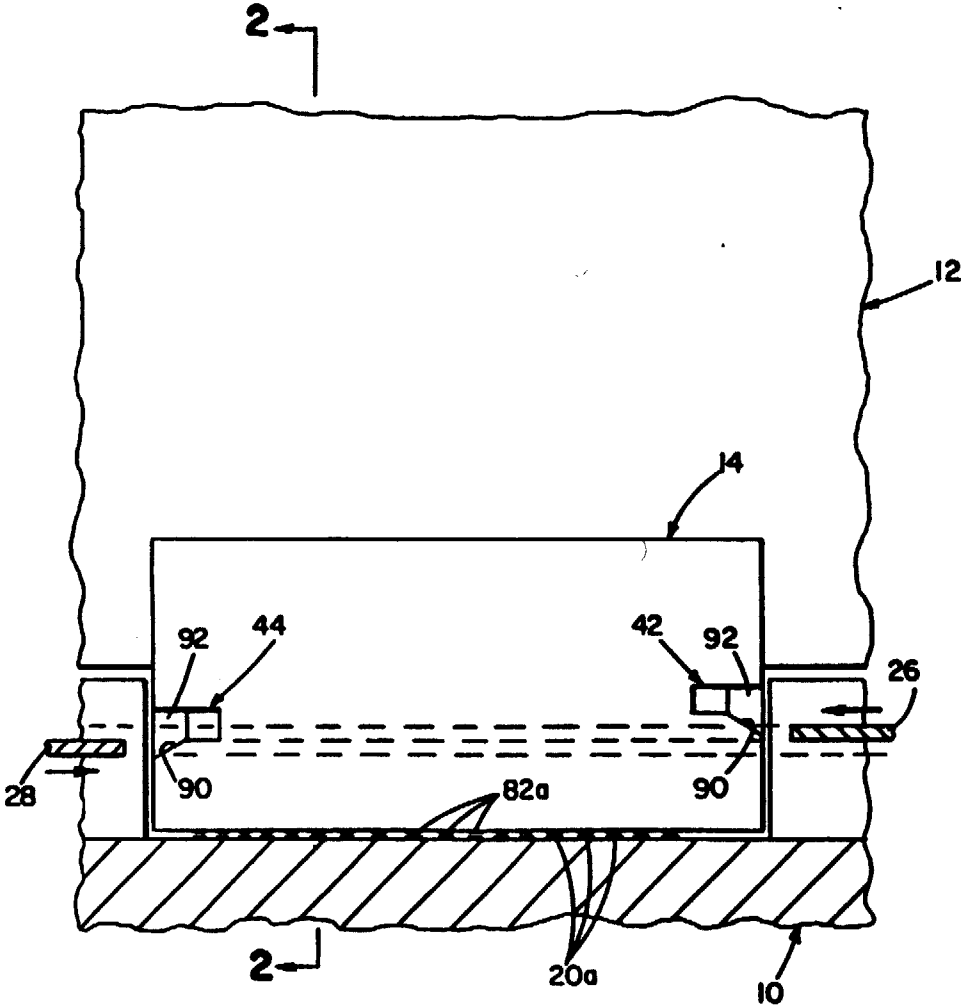
FIG. 1 is a diagrammatic side elevational view with parts broken away of a circuit interconnection system in accordance with the invention.

With reference to FIGS. 1 and 2, the connector system provides electrical interconnections between rigid mother board 10 and daughter board 12, each of which carries circuit components diagrammatically indicated at 8, 9 respectively. Disposed on mother board 10 is an array of pad-type contact terminals 20 (signal terminals 20a and ground terminal 20b) that are connected via circuit traces 22 to circuit components 8. Carried by daughter board 12 is connector block 14 which supports adjacent an edge of daughter board 12 a corresponding array of pad-type contact terminals 82 (signal terminals 82a and ground terminal 82b) of flexible circuit 64 (stripline, microstrip or the like and which circuits may include changes in terminal spacings and/or plural overlapped circuits and the like). Terminals at the other end of flex circuit 64 are soldered or clamped in face-to-face relation against a similar array of terminals that are connected to circuit traces 19 of circuit components 9 on daughter board 12. Connector receptacle structure 24 defines the bounds of terminal array 20, carries connector block biasing springs 32, and supports latch bars 26, 28 that are moved in opposite directions (by an actuator—see actuator 34 in FIGS. 1A and 2A) between an open (released) position and a closed (latching) position. Recesses 42, 44 in the opposite ends of connector block 14 each includes orthogonal ramp surfaces 90, 92.

Upstanding from mother board 10 are oppositely disposed guide channels 36 that receive daughter board 12 for guided, edge-wise insertion of connector block 14 into receptacle 24, with springs biasing block 14 against one side of receptacle 24. When the terminal pad array 82 of flexible circuit 64 is seated on and in general registry with contacts 20 on the mother board 10, the latch portions 30 of sliding bars 26, 28 are disposed in juxtaposed relation to corresponding recesses 42, 44 in the opposite ends of connector block 14, as indicated in FIG. 1. As bars 26, 28 are moved towards one another, their cam surfaces engage the mating orthogonal ramp surfaces 90, 92 and the lower edge of daughter board 12 is pressed tightly against the face of mother board 10 in locking action (as indicated by arrow 15) while the daughter board 12 is concurrently bodily cammed laterally (as indicated by arrow 17) over the surface of the mother board 10 (against the biasing force of springs 32), the contacts 20, 82 wiping upon one another as the boards 10, 12 are moved into locked position.

Figure 1A:
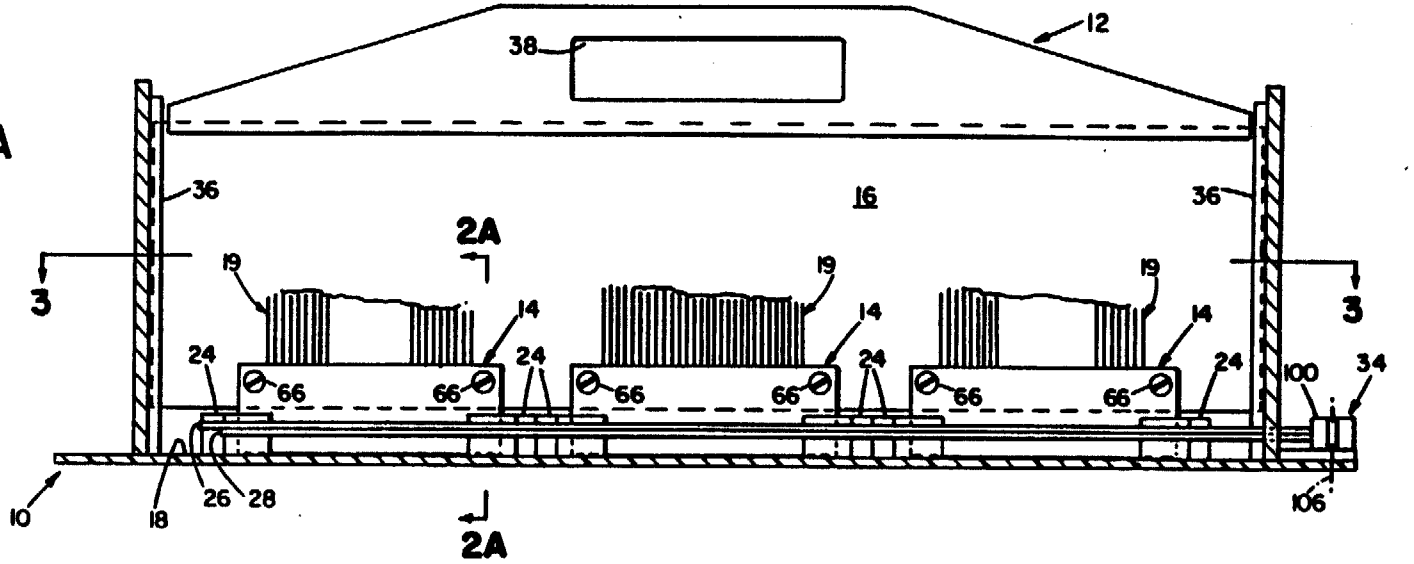
FIG. 1A is a side elevational view of a circuit interconnection system in accordance with the invention.
Figure 3:
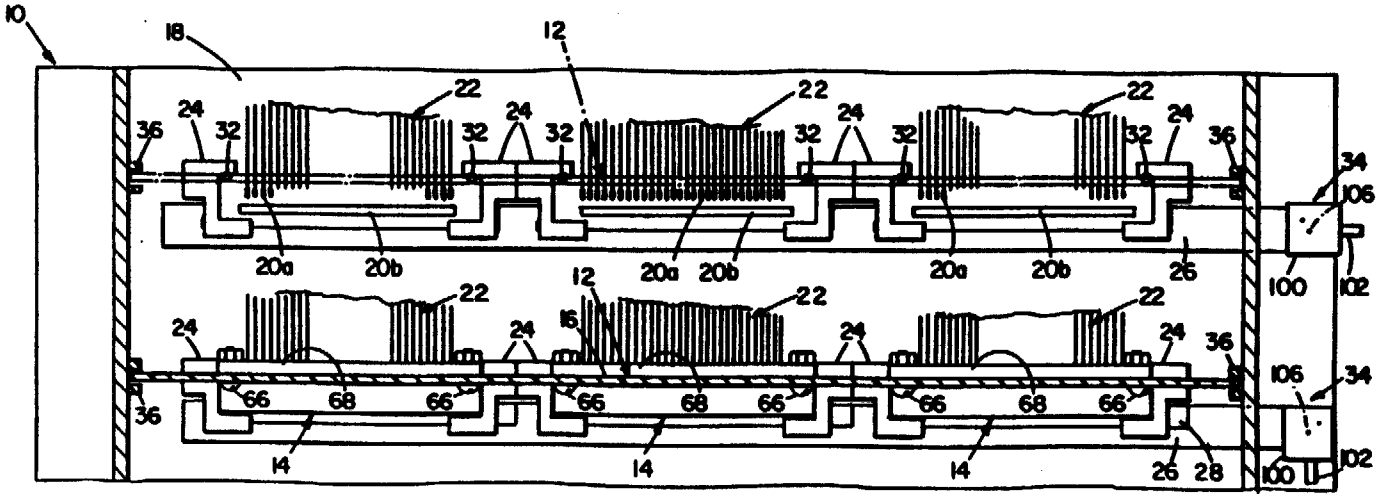
FIG. 3 is a plan view of portions of the circuit interconnection system shown in FIG. 1A.

Further details of this connector system may be seen with reference to FIGS. 1A, 2A and 3, the connector system there shown providing electrical interconnections between a rigid (mother) circuit board 10 and a plurality of associated rigid (daughter) circuit boards 12, each of which carries circuit components 8, 9 (not shown) which may be of conventional type. In the arrangement shown in those Figures, each daughter board 12 carries three individual connector blocks 14 which are bolted or otherwise attached to the daughter board substrate 16. Secured to the mother board substrate 18 are three corresponding arrays of pad-type contact terminals 20 (signal terminals 20a and ground terminals 20b) that are connected via circuit traces 22 to circuit elements carried by the mother board. In a particular embodiment, contact pads 20a have dimensions of about ten mils by one hundred mils and are disposed on twenty-five mil centers. Connector receptacle structure 24 of rectangular configuration defines the bounds of each array of contact terminals and cooperates with sliding latch bars 26, 28 that each have a series of camming and latch portions 30. Each connector receptacle structure also carries connector block biasing springs 32 on the side opposite the latch bars 26, 28. Actuators 34 are adapted to move their respective latch bars 26, 28 between an open (released) position and a latched position. Upstanding from mother board 10 are oppositely disposed guide channel structures 36 that receive corresponding daughter boards 12 for sliding insertion of their connector blocks 14 into the corresponding connector receptacles 24 with biasing springs 32 providing initial positioning of the connector blocks 14 in receptacles 24. Handle 38 may optionally be provided on daughter board 12 to facilitate engagement between the mother and daughter boards.

Further details of connector blocks 14 may be seen with reference to FIGS. 4–11. Each connector block assembly includes a rectangular housing member 40 of a suitable polymeric material such as a polycarbonate with latch recesses 42, 44 at opposite ends that open into the adjacent end wall 46 and side wall 48. Each recess 42, 44 includes orthogonal ramp surfaces 90, 92 as indicated in FIGS. 4, 7, and 10. Formed in opposite side 50 of member 40 is cavity 52 in which two parallel bars 54 are disposed, bars 54 being secured by retaining pin 56 and biased outwardly of cavity 52 by coil springs 58 that are disposed in recesses in bars 54. Received on the outer surfaces of biasing bars 54 is a resilient foam pad 60 (which may be of the type described in U.S. Pat. No. 4,468,074). A terminal pad array of a flexible plural conductor (microstrip) fifty ohm characteristic impedence circuit 64 is seated on pad 60 and secured with fasteners 66 and clamp bar 68 to seat in face to face mating engagement against a similar pad array on daughter board 16.

Disposed in a second similar cavity 72 formed in bottom surface 70 of connector block 40 are two similar parallel contact array biasing bars 74 with associated biasing springs 76 and securing pin 78, together with elastomeric pad 80 on which the terminal array 82 (signal terminals 82a and ground terminal 82b) are secured with fasteners 84 so that the pad terminals 82 are disposed over the resilient elastomeric pads 80 and spring loaded bars 74 to provide resilient loading of the terminals 82.

Signal terminals 82a have dimensions of about ten mils by one hundred mils and are disposed on twenty-five mil centers. Flexible circuit 64 is of "microstrip" configuration and includes one ounce copper (1.4 mil) ground plane that terminates in exposed ground terminal strip 82b and similar ground terminal strip at the opposite ends of circuit 64, three mil thick dielectric, a set of one ounce copper (1.4 mil) conductor traces that extend between terminal pads 82a and similar terminal pads at the opposite ends of circuit 64 (pads 82a being copper plated to a thickness of about three mils and a layer of gold of about fifty microinches thickness on their surfaces), and a three mil thick cover film, the flexible circuit 64 providing controlled impedence high density transmission line conductors between the terminals 82 and corresponding terminals at the opposite end of circuit 64.

Further details of the latch bars 26, 28 and their camming projections 30 and of actuator 34 may be seen with reference to FIGS. 12 and 13. Actuator 34 includes a clevis-type member 100 that has handle portion 102 and a depending post 104 that is received in mother board substrate 18 for rotational movement about axis 106. Upper actuator bar 26 is secured to upper clevis portion 108 by pin 110 which is received in coupling slot 112, and lower latch bar 28 is similarly secured to lower clevis portion 114 by pin 116. Rotation of actuator 34 about axis 106 from the position shown in FIG. 12 to the position shown in FIG. 13 produces transverse movement of latch bars 26 and 28 in opposite directions as indicated in FIGS. 12A and 13A.

With the latch bars 26, 28 in open position (FIG. 12) a daughter board 12 is inserted into the guide channels 36 and its connector blocks 14 are positioned in the corresponding connector receptacles 24 with springs 32 biasing the connector blocks 14 so that signal pads 82 are engaged in generally aligned offset relation with signal pads 20a, and ground terminals 20b and 82b are similarly engaged in generally aligned offset relation as indicated in FIG. 14A. In this position, as actuator 34 is rotated, the camming projection portions 30 are progressively inserted from opposite directions into the recesses 42, 44. Initially, the lower surface of each cam portion 30 engages a ramp surface 90 and urges the connector blocks 14 and terminal pads 82 carried by the connector blocks downwardly against the mother board terminal pads 20 with progressively increasing force as indicated in FIG. 15 (and particularly FIG. 15B—arrow 15). During the initial camming interval, there is no interaction between the cam portions 30 and ramp surfaces 92 as the sloped edges 94 of the cam projections 30 do not engage the vertical ramp surfaces 92. After the initial solely clamping action, as slant cam surface 94 engages ramp surface 92, the resulting conjoint forces of the opposed cam portions 30 shift the flexible circuit contacts 82 laterally (arrow 17) to the position shown in FIG. 16 (and particularly FIGS. 16A and 16C) with concurrent increasing pressure and wiping action. These conjoint pressing and wiping actions, together with the resilient actions of pads 80, produces reliable circuit interconnections, the wiping action removing surface contamination and enhancing the low contact resistance circuit interconnections.

A daughter board 12 is easily released simply by rotating the corresponding actuator 34 in the opposite direction to simultaneously withdraw the latch camming portions 30 from their respective latch recesses 42, 44 in the connector blocks so that the daughter board 12 may be removed.

While a particular embodiment of the invention has been shown and described, various modifications will be apparent to those skilled in the art, and therefore, it is not intended that the invention be limited to the disclosed embodiment, or to details thereof, and departures may be made therefrom within the spirit and scope of the invention.

What is claimed is:

1. A connector system for electrically connecting flexible circuit contacts carried by a daughter printed circuit board with fixed contacts carried by a mother printed circuit board, said flexible circuit contacts being connected to flexible circuit structure that serves as a connector to circuits on the daughter board, and said flexible circuit contacts being arranged adjacent an edge of said daughter board, said system including guides on said mother board for enabling said daughter board to slide in guided, edge-wise direction toward the face of said mother board, with said flexible circuit contacts in registry with said fixed contacts on said mother board, and driven cam/locking means carried by said mother board and engaging mating structure on said daughter board to press said edge of said daughter board tightly toward said face of said mother board in locking motion while camming said daughter board bodily laterally over the surface of said mother board whereby said contacts wipe upon one another as they move into locked position.

2. The connector system of claim 1 wherein said cam/locking means comprises at least one pair of oppositely movable driven members engageable on corresponding cam surfaces defined by said mating structure on said daughter board.

3. The connector system of claim 2 wherein said mating structure on said daughter board comprises a series of block members extending along said edge of said daughter board, said cam surfaces being defined at oppositely directed ends of each of said blocks, said driven members adapted to move against said cam surfaces in motion parallel to the face of said mother board and parallel to said edge of said daughter board.

4. The connector system of claim 3 wherein said flexible circuit structure includes a plurality of conductor traces, a conductive ground plane and interposed dielectric, said flexible circuit structure having a characteristic impedance matched to the impedance of said circuits on said daughter board.

5. The connector system of claim 4 wherein said flexible circuit contacts are of the pad-type and are arranged in a planar array, said contacts being spaced less than about one hundred mils on center.

6. The connector system of claim 5 and further including a resilient contact array mounting that includes a resilient pad member having low stress relaxation when held in compression.

7. The connector system of claim 6 wherein said resilient pad member is supplemented by a plurality of spring loaded biasing members that provide resilient mounting for said contact array to enhance reliable electrical connection between the contacts on said mother and daughter boards, said resilient pad member distributing the contact loading force, and said spring loaded biasing members providing distributed supplemental contact loading and compensation for creep, variations in the thickness or resilience of said pad member, and/or other factors contributing to loss of stress in said pad member.

8. An electrical connector system electrically interconnecting conductive paths of a first circuit with corresponding electrically conductive paths of a second circuit comprising, a first circuit board on which said first circuit is disposed, connector receptacle structure on said first circuit board, a first planar array of pad-type contacts in said connector receptacle structure and connected to said first circuit, a second circuit board on which said second circuit is disposed, connector structure carried by said second circuit board for insertion into said connector receptacle structure, a second planar array of pad-type contacts on said connector structure, said connector structure including structure defining first and second ramp surfaces in orthogonal relation to one another, latch mechanism including a camming surface, actuator structure for moving said camming surface between an open position and a latched position in engagement with said connector structure ramp surfaces, said actuator structure being operable, with said pad-type contact arrays in face to face engagement, to cause said latch mechanism camming surface to interact with said first and second ramp surfaces to produce conjoint clamping and wiping action of said engaged pad-type contact arrays, said latch mechanism in its latched position securing said first and second circuit boards together.

9. The connector system of claim 8 wherein said connector structure is of block configuration and includes a pair of recesses, each of which defines a set of said first and second ramp surfaces in orthogonal relation to one another, said latch mechanism includes a pair of latch members that have opposed camming surfaces, and operation of said actuator structure moves said latch members to cause said opposed camming surfaces of said latch members to enter said recesses and interact with said first and second ramp surfaces, said latch members in their latched position being disposed in said recesses and securing said first and second circuit boards together.

10. The connector system of claim 8 and further including guide channel structure carried by said first circuit board for receiving said second circuit board, said latch mechanism being operative to press said connector structure tightly toward the face of said first board in locking motion while camming said second board bodily laterally in said guide channel structure and over the surface of said first board whereby said contact arrays wipe upon one another as they move into locked position.

11. The connector system of claim 8 wherein said connector receptacle structure further includes biasing structure opposite said latch mechanism.

12. The connector system of claim 8 wherein said connector structure further includes flexible circuit structure that includes a plurality of conductor traces, a conductive ground plane and interposed dielectric, said flexible circuit structure interconnecting the array of pad-type contacts on said connector structure with circuit elements carried by said second circuit board.

13. The connector system of claim 8 wherein said connector structure further includes resilient contact array mounting structure that includes a resilient pad member having low stress relaxation when held in compression.

14. The connector system of claim 8 wherein said connector structure further includes transmission line structure that has a plurality of conductor traces connected to corresponding terminals of said second planar array of pad-type contacts, said terminals being spaced less than about one hundred mils on center.

15. The connector system of claim 14 wherein said transmission line structure is flexible and includes a plurality of conductor traces, a conductive ground plane and interposed dielectric, said transmission line structure interconnecting the array of pad-type contacts on said connector structure with circuit elements carried by said second circuit board.

16. The connector system of claim 15 wherein said connector structure further includes resilient contact array mounting structure that includes a resilient pad member having low stress relaxation when held in compression.

17. The connector system of claim 16 wherein said connector receptacle further includes biasing structure opposite said latch mechanism.

18. The connector system of claim 8 wherein said connector structure further includes an elastomeric pad member supplemented by a plurality of spring loaded biasing members that provides resilient mounting for one of said contact arrays to enhance reliable electrical connection between the contact arrays on said circuit boards, said elastomeric pad member distributing the resilient contact loading force, and said spring loaded biasing members providing distributed supplemental contact loading and compensation for creep, variations in the thickness or resilience of said pad member, and/or other factors contributing to loss of stress in said pad member.

19. A high frequency electrical connector system for electrically interconnecting conductive paths of a first circuit element with corresponding conductive paths of a second circuit element comprising a first planar array of pad-type contacts that are disposed on a first nonconductive substrate, flexible sheet-form plural conductor transmission line structure that has one end electrically connected to said first circuit element and its other end connected to corresponding pad-type contact of said array, a resilient contact array mounting that includes an elastomeric member supplemented by a plurality of spring loaded biasing members, said elastomeric member distributing resilient contact loading force, and said spring loaded biasing members providing distributed supplemental contact loading and compensation for creep, variations in the thickness or resilience of said pad member, and/or other factors contributing to loss of stress in said pad member, a cooperating second array of pad-type contacts mounted on a second nonconductive contact support substrate and electrically connected to said second circuit element, and locking means carried by one of said substrates and engaging mating structure on the other of said substrates for pressing said substrates together in locking motion while camming said first array laterally over the surface of said second array whereby said pad-type contacts wipe upon one another as they move into locked position.

20. The connector system of claim 19 wherein said flexible plural conductor transmission line structure includes a ground plane and plural conductor traces that have characteristic impedances matched to the impedance of the electrical circuit to which they are connected.

*21. An electrical connector system for electrically interconnecting, in a readily removable manner, circuit boards that have a generally orthogonal relationship with each other, comprising:*

*first and second rigid circuit boards on which arrays of conductive paths of respective first and second circuits are disposed,*

*first connector structure,*

*a flexible circuit that carries conductive paths that correspond to the circuits to be connected, said flexible circuit being supported by said first connector structure,*

*second connector structure with which said first connector structure can be mateably, releasably engaged,*

*one of said connector structures being mounted on said first rigid circuit board in position to engage the other of said connector structures, and the other of said connector structures being mounted on the face of said second rigid circuit board in position to be engaged,*

*an electrical interconnection between the conductive paths of the circuit board on which said first connector structure is mounted and the corresponding conductive paths of said flexible circuit, and*

*said mateable connector structures constructed and arranged to enable, releasable electrical interconnection between conductive paths on the other of said circuit boards and the corresponding conductive paths of said flexible circuit by reversible motions that include engaging motion of said first circuit board edgewise toward the face of said second circuit board, to carry the connector structure mounted on said first circuit board into mating engagement with the connector structure mounted on the face of said second board, and motion of one of said connector structures in a direction transverse to the direction of said engaging motion.*

*22. The electrical connector system of claim 21 wherein a cam arrangement associated with said connector structures causes motion of said connector structure on said first board in said transverse direction.*

*23. An electrical connector system for electrically interconnecting, in a readily removable manner, circuit boards that have a generally orthogonal relationship with each other, comprising:*

*first and second rigid circuit boards on which arrays of conductive paths of respective first and second circuits are disposed,*

*first connector structure,*

*a flexible circuit that carries conductive paths that correspond to the circuits to be connected, said flexible circuit being supported by said first connector structure,*

*second connector structure with which said first connector structure can be mateably, releasably engaged,*

*one of said connector structures being mounted on said first rigid circuit board in position to engage the other of said connector structures, and the other of said connector structures being mounted on the face of said second rigid circuit board in position to be engaged,*

*an electrical interconnection between the conductive paths of the circuit board on which said first connector structure is mounted and the corresponding conductive paths of said flexible circuit, and*

*said mateable connector structures constructed and arranged to enable releasable electrical interconnection between conductive paths on the other of said circuit boards and the corresponding conductive paths of said flexible circuit by reversible motions that include engaging motion of said first circuit board edgewise toward the face of said second circuit board, to carry the connector structure mounted on said first circuit board into mating engagement with the connector structure mounted on the face of said second board, and motion of said connector structure on said first*

*circuit board in a direction transverse to the direction of said engaging motion,*

*there being spring means disposed between said connector structures to bias said connector structures transversely relative to one another to one side during said engaging motion, and a cam arrangement associated with said connector structures, effective to cause said connector structure on said first board to move in a direction transverse to the direction of said engaging motion in opposition to said spring means.*

*24. The electrical connector system of claim 21 or 23 wherein said transverse motion is perpendicular to the plane of said first board.*

*25. The electrical connector system of claim 22 or 23 wherein said cam arrangement includes a ramp surface carried by one of said connector structures engaged in a relative slidable camming motion by an element carried by the other connector structure to produce said transverse motion.*

*26. The electrical connector system of claim 22 or 23 wherein said cam arrangement includes means to enable increase of pressure upon an array of contact pads associated with conductive paths of said system.*

*27. The electrical connector system of claim 22 or 23 wherein said cam arrangement includes means to enable wipe of an array of contact pads associated with conductive paths of said system.*

*28. The electrical connector system of claim 22 or 23 constructed and arranged to enable application of pressure upon an array of contact pads associated with conductive paths of said system preceding wipe of said contact pads.*

*29. The electrical connector system of claim 22 or 23 wherein said cam arrangement includes means effective, in producing said transverse movement, to bodily move said first rigid circuit board transversely along with said connector structure thereon.*

*30. The electrical connector system of claim 29 wherein said first rigid circuit board is a daughter board and said second rigid circuit board is a mother board.*

*31. The electrical connector system of claim 23 wherein one of said connector structures is a receptacle structure into which the other of said connector structure is insertable, and said receptacle structure carries said biasing spring means.*

*32. The electrical connector system of claim 31 wherein one of said connector structures supports latch means for securing said releasable electrical connection.*

*33. The electrical connector system of claims 21 or 23 wherein one of said connector structures is a receptacle structure into which the other of said connector structures is insertable, said insertable connector structure supporting said flexible circuit,*

*an array of contacts is disposed on the circuit board on which said connector receptacle is mounted, with said connector receptacle structure defining the bounds of said array of contacts on said circuit board.*

*34. An electrical connector system for electrically interconnecting, in a readily removeable manner, circuit boards that have a generally orthogonal relationship with each other, comprising:*

*first and second rigid circuit boards on which arrays of conductive paths of respective first and second circuits are disposed,*

*first connector structure,*

*a flexible circuit that carries conductive paths that correspond to the circuits to be connected, said flexible circuit being supported by said first connector structure,*

*second connector structure defining a receptacle into which said first connector structure can be mateably, releasably inserted,*

*one of said connector structures being mounted on said first rigid circuit board adjacent an edge thereof in position to engage the other of said connector structures, and the other of said connector structures being mounted on the face of said second rigid circuit board in position to be engaged,*

*an electrical interconnection between the conductive paths of the circuit board on which said first connector structure is mounted and the corresponding conductive paths of said flexible circuit, and*

*said mateable connector structures constructed and arranged to enable releasable electrical interconnection between conductive paths on the other of said circuit boards and the corresponding conductive paths of said flexible circuit by reversible motions that include engaging motion of said first circuit board edgewise toward the face of said second circuit board, to cause insertion of said first connector structure into said receptacle, and motion of said connector structure on said first circuit board in a direction transverse to said insertion direction,*

*there being spring means disposed between said first connector structure and said receptacle connector structure to bias said connector structures transversely relative to one another during insertion motion,*

*and a cam arrangement associated with said connector structures, effective to cause said connector structure on said first board to move in a direction transverse to the direction of said insertion motion in opposition to said spring means.*

*35. The electrical connector system of claims 21, 23 or 34 constructed to enable wiping action of a predetermined extent at contacts on one of said circuit boards during final movement of said connector structures to a secure position.*

*36. An electrical connector system for electrically interconnecting, in a readily removable manner, circuit boards that have a generally orthogonal relationship with each other, comprising:*

*first and second rigid circuit boards on which arrays of conductive paths of respective first and second circuits are disposed,*

*first connector structure,*

*a flexible circuit that carries conductive paths that correspond to the circuits to be connected, said flexible circuit being supported by said first connector structure,*

*second connector structure with which said first connector structure can be mateably, releasably engaged,*

*one of said connector structures being mounted on said first rigid circuit board in position to engage the other of said connector structures, and the other of said connector structures being mounted on and projecting outwardly from the face of said second rigid circuit board in position to be so engaged,*

*an electrical interconnection between the conductive paths of the circuit board on which said first connector structure is mounted and the corresponding conductive paths of said flexible circuit, and*

*said connector structure being mateably engageable by motion of one of said rigid circuit boards and its connector structure in edgewise engaging motion toward the face of the other rigid circuit board;*

*cooperating, sliding rigid ramp surfaces carries by each of said connector structures constructed to engage during edgewise movement of said first board toward*

*said second board to cause simultaneous lateral wiping and edgewise pressure applying actions of predetermined extent at contacts on one of said circuit boards for electrical connection between said contacts and the corresponding conductive paths of said flexible circuit by final pressure-applying edgewise movement of said first board toward the face of said second board.*

*37. The electrical connector system of any one of claims 21, 22, 23, 34 or 36 wherein an array of contacts on said flexible circuit receives biased support for electrical connection by an elastomeric pad member supplemented by a plurality of spring loaded biasing members that provide resilient mounting for said contacts to enhance reliable electrical connection, said elastomeric pad member distributing the resilient contact loading force, and said spring loaded biasing members providing distributed supplemental contact loading and compensation for creep, variations in the thickness or resilience of said pad member, and/or other factors contributing to loss of stress in said pad member.*

*38. The electrical connector system of any one of claims 21, 22, 23, 34 or 36 wherein both portions of said flexible circuit are provided with arrays of contacts biased for electrical connection, each by an elastomeric pad member supplemented by a plurality of spring loaded biasing members that provide resilient mounting for said contacts to enhance reliable electrical connection, said elastomeric pad member distributing the resilient contact loading force, and said spring loaded biasing members providing distributed supplemental contact loading and compensation for creep, variations in the thickness or resilience of said pad member, and/or other factors contributing to loss of stress in said pad member.*

*39. The electrical connector system of claim 21, 22, 23, 34 or 36 wherein the flexible circuit and the configuration of said conductive paths thereon provide predetermined impedance values.*

* * * * *

UNITED STATES PATENT AND TRADEMARK OFFICE

CERTIFICATE OF CORRECTION

PATENT NO. : Re. 34,190
DATED : March 9, 1993
INVENTOR(S) : Leon Rubinstein

It is certified that error appears in the above-indentified patent and that said Letters Patent is hereby corrected as shown below:

Title page, col. 2, page 2, under Foreign Patent Documents, last line insert--1986 IEPS, "Backplane Interconnection System"--.

Signed and Sealed this

Fourteenth Day of February, 1995

*Attest:*

Bruce Lehman

BRUCE LEHMAN

*Attesting Officer*

*Commissioner of Patents and Trademarks*